Figure 6:
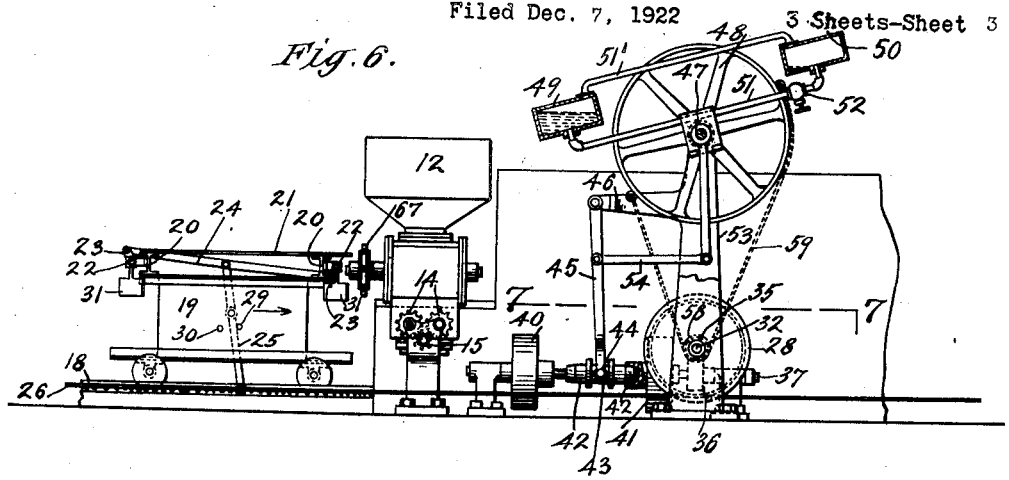

March 24, 1925. 1,531,088
G. P. FULLER
PROCESS OF MAKING CHROMATES
Filed Dec. 7, 1922 3 Sheets-Sheet 1
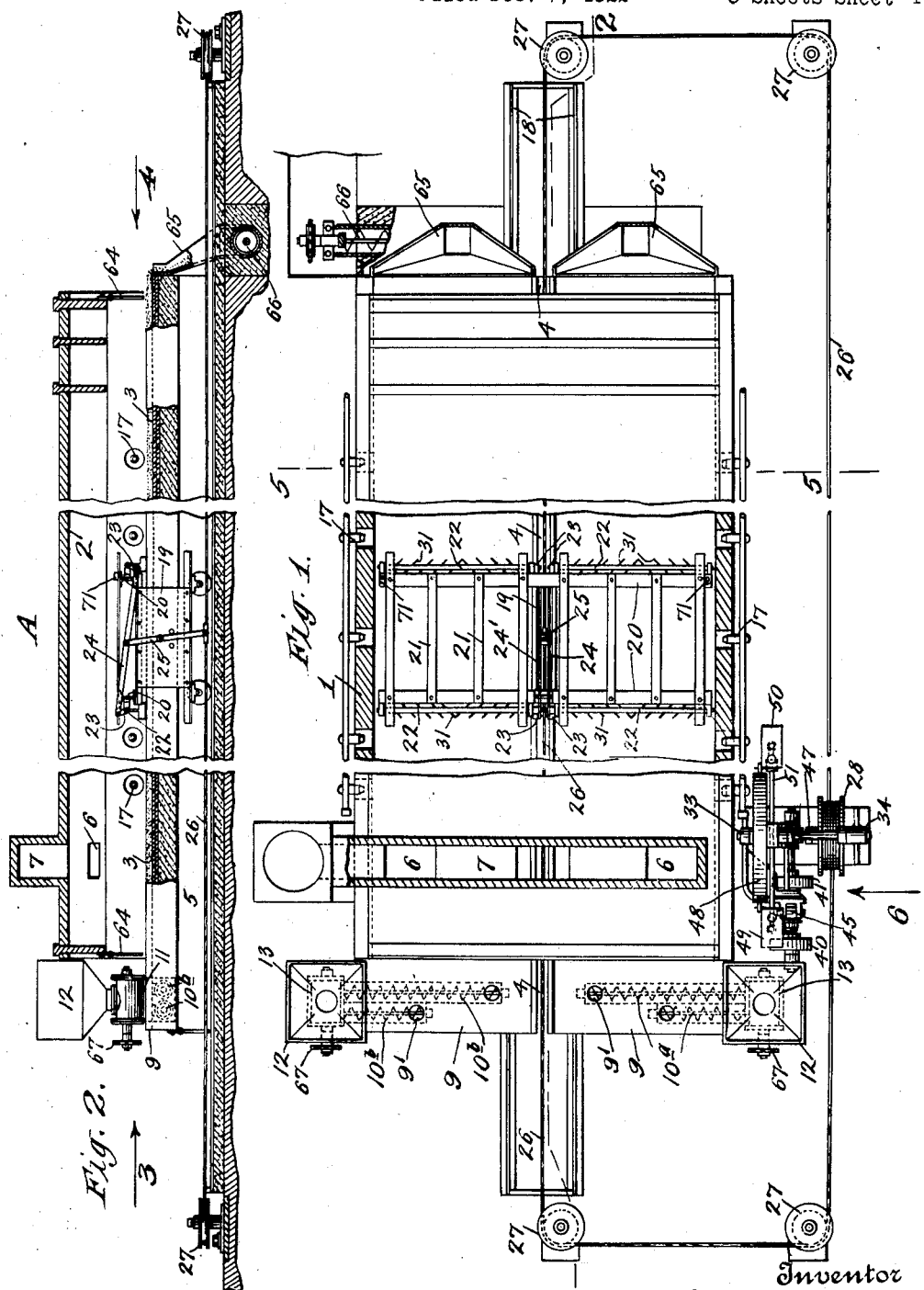
Inventor
George P Fuller
By his Attorneys

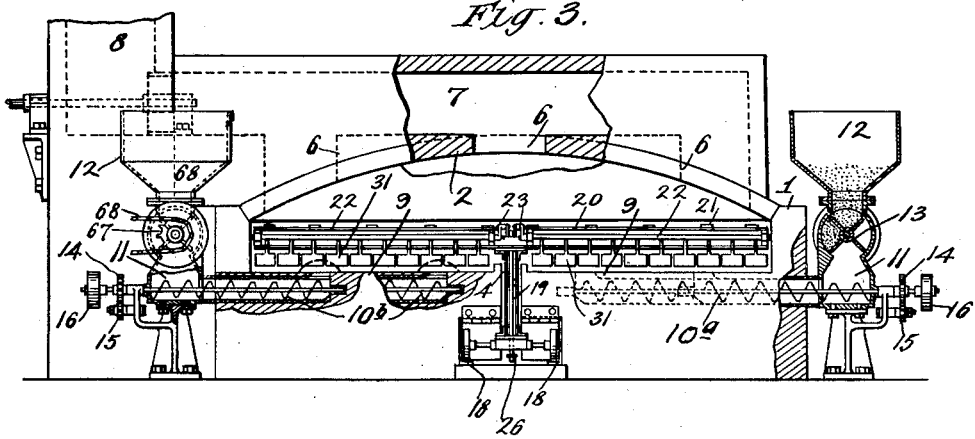
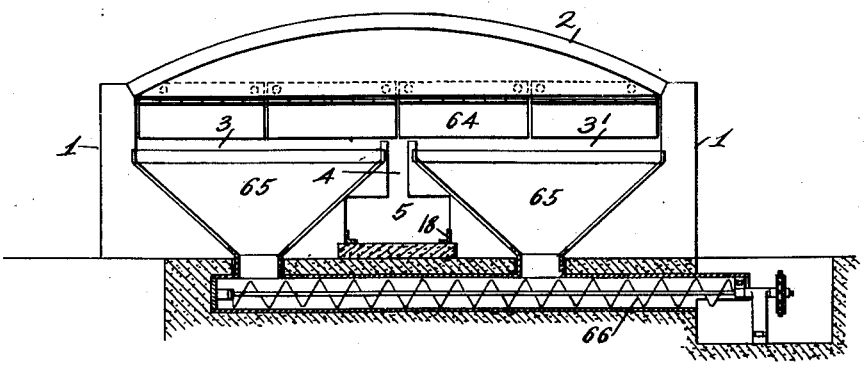
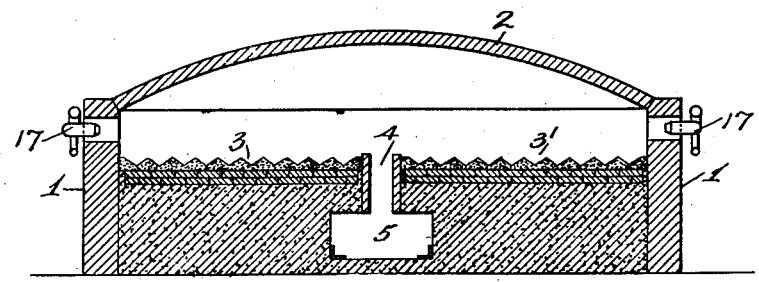

March 24, 1925.

G. P. FULLER 1,531,088

PROCESS OF MAKING CHROMATES

Filed Dec. 7, 1922   3 Sheets-Sheet 3

Inventor
George P Fuller
By his Attorneys

Patented Mar. 24, 1925.

1,531,088

UNITED STATES PATENT OFFICE.

GEORGE P. FULLER, OF LA SALLE, NEW YORK, ASSIGNOR, BY MESNE ASSIGNMENTS, TO EDWARD MICHAEL, OF BUFFALO, NEW YORK.

PROCESS OF MAKING CHROMATES.

Application filed December 7, 1922. Serial No. 605,360.

*To all whom it may concern:*

Be it known that I, GEORGE P. FULLER, a citizen of the United States, residing at La Salle, county of Niagara, and State of New York, have invented certain new and useful Improvements in Processes of Making Chromates, fully described and represented in the following specification and the accompanying drawings, forming a part of the same.

This invention relates to an improved process of making chromates.

In the prior processes of making chromates, it is customary to roast a chrome ore with an alkali metal carbonate and an infusible alkaline absorbent material or carrier such as lime, in an oxidizing atmosphere. The chrome ore heretofore employed and known as chromite, comprises the chrome compound represented by the formula $FeO.Cr_2O_3$ and some gangue. This ore in a comminuted condition is mixed with an alkali metal carbonate, for example, either potassium or sodium carbonate, and lime. The mix is then roasted in an oxidizing atmosphere at a temperature of about 1000° to 1100° C. The chrome compound $FeO.Cr_2O_3$ is oxidized to $Fe_2O_3 + CrO_3$. Then the $CrO_3$ reacts with the potassium or sodium carbonate. If, for example, sodium carbonate be used in the process, as is common, the $CrO_3$ reacts with the $Na_2CO_3$ to form $Na_2CrO_4$. Because sodium carbonate fuses at a temperature around 849° C. and sodium chromate at a lower temperature, the lime acts as an infusible alkaline absorbent material to hold the fused sodium chromate and the fused sodium carbonate so that they will not flow out of the furnace. At the completion of the process as heretofore carried out, the reaction has not usually been complete, so that the final product has been a mixture of sodium chromate, lime, and gangue with some unconverted $FeO.Cr_2O_3$ and some sodium carbonate, the latter and the sodium chromate being in a fused condition. This mass of pasty material when discharged from the furnace in the manner customary in the prior process quickly cools in large blocks or cakes. These blocks are then leached in batches in a leaching tank, the sodium chromate and the sodium carbonate, if any, going into solution. This solution is then drawn off for further treatment to recover the sodium chromate.

The large masses or blocks of the solidified material are difficult to leach and processes have been suggested where the said masses are first crushed and then go to the leaching vats. These processes, however, have been objectionable on account of the considerable amount of dust produced and partly lost during the crushing and handling of the material. Furthermore, the crushing process involves an additional expense.

The purpose of the present invention is to reduce the labor involved in the prior processes and to improve the efficiency.

The invention will first be described in connection with the accompanying drawings and then more particularly pointed out.

Figure 7:
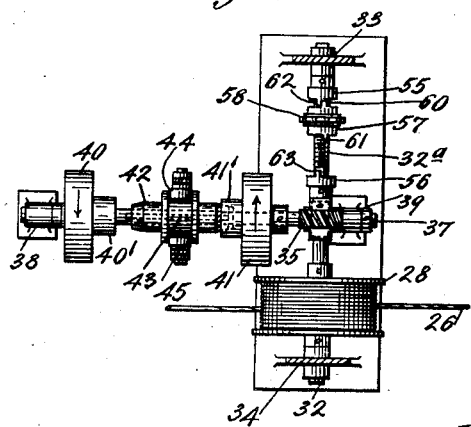

In the drawings:

Fig. 1 is a broken plan view, partly in section, of an apparatus particularly suitable for carrying out the invention;

Fig. 2 a broken longitudinal section on the line 2—2 of Fig. 1;

Fig. 3 a front end view, partly in section, looking in the direction of the arrow 3, Fig. 2;

Fig. 4 a rear end view, partly in section, looking in the direction of the arrow 4, Fig. 2;

Fig. 5 a transverse section on the line 5—5, Fig. 1;

Fig. 6 a side elevation of the cable operation mechanism, showing also a side view near the front end of the furnace with the agitating or rabbling mechanism withdrawn from the furnace;

Fig. 7 a detail plan view of the cable drum and its operating mechanism; and

Figure 8:
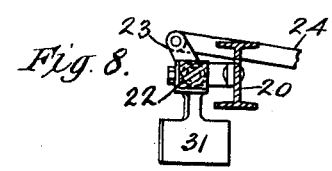
Figure 10:
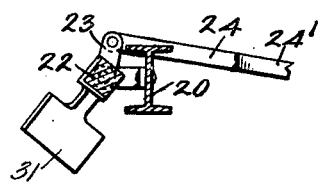
Figure 9:
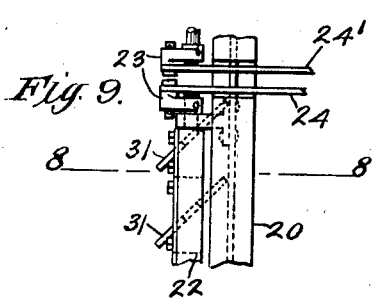

Figs. 8, 9, and 10, detail views of the plows or scrapers.

In carrying out the new process the same mixture is used as in the old process. This mix comprising comminuted chromite ore, accompanied usually by some gangue, an alkali carbonate, preferably sodium carbonate, and an absorbent material such as lime, CaO, is roasted at a temperature of about 1000° C. in an oxidizing atmosphere and is well agitated so as to insure good contact of the material with the atmosphere. Then, while still maintaining the agitation and the oxidizing atmosphere the material is cooled gradually until it reaches a temperature at or below its point of solidification. As a result of this process the material is maintained in a granular condition and is discharged from the furnace as a mass of separate, solid, and nonadhesive granules, which will no longer adhere to one another.

The agitation to bring about the granular condition of the final product must begin in the furnace when the material is pasty or adhesive and must continue until the granules have cooled to a nonadhesive condition, before discontinuing the agitation. During this cooling and agitating step of the process the oxidizing atmosphere is maintained because in practice it is found that thereby any $FeO.Cr_2O_3$ which escapes conversion at the hottest part of the furnace can still be oxidized and converted into sodium chromate during the cooling state. Hence not only is a better product obtained but the efficiency of the process is enhanced.

In the best example of the process, the starting materials are ground to a fine powder. The lime and the sodium carbonate are ground so that none will be coarser than 100 mesh. The ore is ground to pass 130 mesh. The ingredients, after grinding, are very thoroughly mixed, special effort being made to produce a uniform mixture. While the proportions may be varied according to the nature of the ore and the quality of the materials, the following proportions by weight have been found satisfactory, viz,

|  | Parts. |
|---|---|
| Chromite | 415 |
| Lime | 415 |
| Sodium carbonate | 270 |

The sodium carbonate may be employed in the form of soda ash, in which case the amount of soda ash is taken so as to give the proportion of sodium carbonate as stated above.

This mixture of comminuted materials is then fed to a furnace which has a hot zone whose temperature is sufficient to heat the mix to about 1000 to 1100° C. In the hot zone an oxidizing atmosphere is maintained, as, for example, by providing a free flow of air through the furnace over the mix. The latter is well agitated in order to insure a good contact between the air and the particles of the mix. The furnace is so extended beyond the hot zone that a zone of gradually lowering temperatures is provided, which may be termed a cooling zone. From the hot zone the mix is fed to and through the so-called cooling zone and during its travel through this zone is agitated and exposed to the oxidizing atmosphere in such a way that the pasty material in and coming from the hot zone is not allowed to cohere but is maintained as a mass of separate granules. This exposes more surface to the oxidizing atmosphere and hence causes a continuation of the oxidation of the chrome ore even after it has passed the hot zone. Also the granular condition is maintained until finally the material reaches a temperature below the fusing point of any materials it contains and is no longer pasty or adhesive. Thereupon the material is discharged from the furnace in a granular non-adhesive condition, and hence remains granular. In practice the material is allowed to cool to about 700° C. in the furnace and then is discharged therefrom.

The apparatus shown in the accompanying drawings is particularly suited for carrying out the new process on a large scale.

Referring to the drawings, A is a furnace having side walls 1, a top 2, preferably arched, as shown in Figs. 4 and 5, and a bottom divided into two hearths 3, 3' by a vertical slot 4 opening into a conduit 5 which extends the full length of the furnace and is open at each end.

The furnace chamber is provided with an outlet for the escape of gases. In the particular construction shown in the drawings, the top or arch of the furnace is provided with a series of flues, as indicated at 6, communicating with a main flue 7 leading to a stack 8.

The bottom of the furnace extends outside somewhat beyond the top or arch at the front end so as to form charging tables, one at each side of the slot, as indicated at 9, Fig. 1. The mix may be suitably supplied to these charging tables, but in the embodiment of the invention shown, suitable automatic means for supplying the mix to the hearths is provided. In the present example this charging means comprises screw conveyors arranged in casings or trunks arranged below the hearths and arranged to force the mix upward through openings 9' in the hearths thereby forming piles of the mix above the level of the hearth.

In the example illustrated each charging table has a plurality of openings, for example, two, and these are supplied with mix by the corresponding screw-conveyors as indicated at 10$^a$ and 10$^b$. Each conveyor carries the mix from a boot, as indicated at 11, and each boot is supplied with mix from a hopper 12, by a rotary gate device 13, which carries measured charges of mix from the hopper to the conveyor boot. The respective conveyors are driven in any suitable way. In the drawings, the shafts of the two conveyors at one side of the furnace are provided with gear wheels 14, which mesh with an idler gear wheel 15. See Fig. 6. One of the conveyor shafts is provided with a pulley 16, driven from a suitable source of power, not shown.

The furnace is heated along a part only of its length, thus forming a zone of maximum temperature. In the best embodiment of the invention such as that shown in the drawing, the zone of maximum temperature is located at a portion of the furnace intermediate its ends. Any suitable heating means may be used. As shown, the heating means comprises a series of burners arranged along each side of the furnace, as indicated at 17, Figs. 1 and 2. By locating the zone of maximum temperature intermediate the ends of the furnace there is provided a preheating section or portion of the furnace at the front end of the furnace and what may be termed a cooling chamber at the rear end of the furnace. In the preheating section of the furnace the temperature gradually increases from the front to the hottest zone, while in the cooling chamber the temperature gradually decreases from the hottest zone toward the discharge end.

Suitable means is provided for feeding the mix from the charging tables along the hearths of the furnace and for agitating the material. In the example shown the means for feeding and for agitating comprises one unitary structure performing both functions. This structure, as shown in the drawing, consists of a truck or trolley running on tracks 18 in the conduit and carrying a standard 19 which is made narrow so that it may extend upward through the slot in the furnace bottom. This standard may be made of two vertical plates, suitably connected by end pieces, as shown. The top of the standard 19 is above the hearths of the furnace and to it are secured girders as indicated at 20, which extend transversely substantially the full width of the furnace. The girders 20 may be suitably connected by beams 21 these girders and beams forming a frame as shown in plan in Fig. 1. In this frame four shafts 22 are journaled, one pair of shafts being at the front of the framework and the other pair at the rear of the frame work. The shafts of each pair are in line with each other, and their adjacent ends are provided with cranks, indicated at 23. The cranks on the front pair of shafts extend upward while the cranks on the rear pair of shafts extend downward. The crank on the right hand front shaft is connected to the crank on the right hand rear shaft by a connecting rod 24 and the cranks on the left hand front and rear shafts are connected by another connecting rod 24'. These two parallel connecting rods are both pivoted to an operating lever 25 whose lower end is pivotally connected to an endless cable 26 which passes entirely through the conduit, around sheaves 27 and around a cable drum 28 arranged at one side of the furnace, as shown in Fig. 1. It is obvious that if the cable is pulled in one direction it will first swing the operating lever 25 and thereby give a partial rotation to the four shafts 22. The amount of movement of the lever determines the extent of rotation of the shafts. This movement of the lever is limited by stops 29 and 30 arranged one at each side of the lever, as shown in Fig. 6. When the cable pulls the lever 25 in a given direction, the lever comes into contact with the corresponding stop, after which the further travel of the lever moves the truck with its attached mechanism through the furnace.

On each shaft is mounted a series of radial arms, each provided with a scraper or plow blade 31. The blades are set on the shafts at an angle to the direction of travel of the structure through the furnace, being so arranged that when the bottom edges of the blades are parallel to the surfaces of the hearths, the blades will plow the mix or materials on the hearths forward and also will turn it over transversely. In the particular embodiment shown, some of the blades on a shaft serve as right hand plows and the other blades on the same shaft serve as left hand plows, as will be clear from Fig. 1. The arrangement of the rear plows is such that the plows nearest the slot in the furnace bottom tend to plow the material away from the slot and toward the side walls while the plows nearest the side walls tend to plow the material toward the slot.

When the cable reverses its direction, that is, starts to move in a backward direction through the furnace it first swings the lever 25 to rotate the shafts to a limited extent and then pulls the truck and its attached mechanism backward. The rotation of the shafts swings the radial arms upward away from the hearths, but this brings the lower or trailing corner of each forward plow into such a position that it drags in the peak of the furrow laid over by the rear blade when the mechanism was moving in the opposite direction. Therefore, the backward movement of the plows tends to form a small furrow in the top of each large pile, heap or window, thereby exposing more surface to the oxidizing atmosphere. In this way the material is pushed forward to a certain extent at each forward movement of the plows, and there is no backward travel of the material during the backward movement, but only a slight disturbance of a part of the material. This disturbance, however, is very important as it increases the surface area exposed to the oxidizing atmosphere and also brings fresh surfaces into contact with the air.

The cable drum 28 may be operated in any suitable manner to pull the cable in opposite directions to the desired predetermined extent. For this purpose it is advantageous to employ an automatic apparatus which controls the operation of the cable drum. This automatic apparatus includes means for determining the interval of rest between operations of the drum in first one direction and then in the other, and also includes means for determining the extent to which the drum is rotated in each direction. In the specific example illustrated in the drawings, the cable-drum 28 is fixed on a drum shaft 32 having its ends journaled in bearings 33 and 34 near the center of the shaft. A worm-wheel 35 is secured to it. This worm-wheel is engaged by a worm 36 fixed on a driving shaft 37 which is journaled at its ends in bearings 38 and 39.

On the driving shaft 37 are loosely mounted two pulleys 40 and 41 which are continuously rotated in opposite directions by belts such as a straight and a cross-belt driven from a suitable countershaft or the like, not shown.

Each pulley is provided with a clutch-jaw, 40′, 41′, arranged to be engaged by corresponding jaws on the ends of a clutch-sleeve 42 which is splined to the driving shaft, and is longitudinally movable thereon so as to be brought into engagement with either of the jaws carried by the pulleys. The clutch-sleeve has a grooved collar 43 secured to it, the groove in which is engaged by rollers 44 carried by the forked end of a clutch-shifting lever 45 fulcrumed at its upper end on a suitable frame work 46. In the upper part of this framework is journaled a shaft 47 on which is fixed a large wheel 48. Two tanks 49 and 50 are mounted so as to move in unison with the large wheel 48, these tanks being connected at their bottoms by a pipe 51 having a suitable valve 52 capable of fine adjustment, as, for example, a needle-valve. To the shaft 47 is fixed an arm, 53, which is connected to the clutch-shifting lever 45 by a link 54.

The drum-shaft 32 has one end provided with a screw thread, as indicated at 32ª in Fig. 7, and at each end of the screw threaded portion the shaft is provided with collars 55 and 56 adjustably fixed to the shaft. Mounted on the screw-threaded portion 32ª is a nut 57 whose periphery carries or serves as a sprocket wheel 58, which engages a sprocket chain 59 whose ends are fixed to the large wheel 48 at opposite ends of a diameter of the large wheel. It is advantageous to provide the nut 57 on its opposite faces with axially projecting pins or lugs, one at each end, as indicated at 60 and 61. These pins or lugs are arranged to engage corresponding pins or lugs projecting axially from the collars 55 and 56, as indicated at 62 and 63.

In Fig. 6 the left hand tank 49 is shown as containing a liquid. This is usually a liquid hydrocarbon, and in practice kerosene is preferred. In the condition of the apparatus shown in Figs 6 and 7, the clutch sleeve 42 is connected to the right hand pulley 41 which is supposed to be rotating in the direction of the arrow. This will rotate the drum shaft 32 in such a direction as to cause the nut 57 which is held stationary by the sprocket chain, to travel towards the drum. As soon as the nut has traveled so close to the collar 56 that the lugs 61 and 63 are engaged, the nut 57 and its sprocket wheel 58 will be rotated by the drum shaft and the sprocket chain will turn the large wheel 48 in such a direction as to elevate the left hand tank 49 and also to shift the clutch sleeve 42 out of engagement with the pulley 41 and into an intermediate non-engaging position. This stops the drum. Pipe 51′ provides for air displacement.

The liquid in the elevated tank now flows through the pipe 51 into the lower tank 50, the rate of flow being determined by the setting of the valve 52. When sufficient liquid has flowed into the tank 50, so that its weight will overcome the friction of the apparatus, this weight will cause the large wheel 48 to make a partial movement of rotation in such a direction as to still further lower the tank 50. This motion causes the nut 57 to be rotated in such a direction that it will travel along the screw-threaded portion of the drum-shaft, disengaging the lug 61 from the lug 63. This operation causes the clutch-sleeve 42 to be thrown over to engagement with the pulley 40, and reverses the direction of rotation of the drum-shaft, at the same time causing the nut 57 to travel toward the outer end of the drum-shaft, where it finally engages its lug 60 with the lug 62 on the collar 55. Thereupon the nut 57 and its sprocket-wheel 58 are rotated by collar 55 on the drum-shaft 32 and, through the sprocket chain 59, this motion is transmitted to the large wheel 48 to elevate the tank 50 again above tank 49 and also to shift the clutch-sleeve 42 to its middle position and stop the drum.

The liquid then flows gradually from the tank 50 to the tank 49 until the latter is filled to such an extent that its weight will rotate the large wheel 48 still further in the same direction it moved last, thus shifting the clutch-sleeve 42 into engagement with the pulley 41 and rotating the nut 57 to separate its lug 60 from the lug 62 of the collar 55. The drum will now commence to operate in the original direction. Fig. 6 shows the apparatus just at the moment when the clutch has been thus shifted.

It will be seen that the length of travel of the nut 57 between the two collars 55 and 56 will determine the extent of rotation of the drum and the amount of travel of the cable in each direction. Also, by adjusting the valve 52 in the pipe 51 the rate of flow of liquid from one tank to the other may be controlled and thereby the time between operations of the cable may be determined within certain limits.

To prevent loss of heat, suitable curtain doors 64 may be hung at the front and rear ends of the furnace.

At the discharge end of the furnace suitable hoppers 65 may be provided to receive the discharged material. These hoppers may discharge into the trough of a suitable conveyor 66, which may discharge the materials at one side of the furnace, from whence it may be removed in any suitable way.

The rotary gates 13 which supply the mix to the charging conveyors $10^a$ and $10^b$ may be operated in any suitable way. As shown in the drawings, the shafts on which the rotary gates are mounted are provided with sprocket wheels 67, each of which is driven by a chain 68 intermittently, by a suitable source of power, not shown.

While, in the description hereinbefore, an alkali metal carbonate such as potassium or sodium carbonate has been mentioned as particularly suitable in preparing the mix, it will be understood by those skilled in the art that any other compound of an alkali-forming metal such as an hydroxide of a suitable alkali metal may be employed as an equivalent for the alkali metal carbonate. The term "alkali metal carbonate" as used in the claims is therefore to be construed as including the use of such an equivalent.

What is claimed is:

1. The process of making chromates which consists in roasting, in an oxidizing atmosphere, a mix comprising a chrome ore, an alkali metal carbonate, and a relatively infusible alkaline absorbent, at a temperature above the fusing point of the alkali metal carbonate, submitting the material thus obtained to successively lower temperatures until it has cooled below the fusion point of the alkali metal chromate formed, and during this cooling agitating the material until a granular product is obtained.

2. The process of making chromates which consists in gradually heating up a mix comprising a chrome ore, an alkali metal carbonate, and a relatively infusible alkaline absorbent to a temperature above the fusing point of the alkali metal carbonate, and then gradually cooling down the material to a temperature below the fusing point of the alkali metal chromate formed, agitating the materials during the heating up and cooling down, and maintaining an oxidizing atmosphere during the heating up and cooling down until a granular product is obtained.

3. The process of making chromates, which consists in maintaining a heated zone having differing temperatures at different points in the length of the zone, the maximum temperature being above the fusing point of the alkali metal carbonate and the minimum temperature being below the fusing point of the alkali metal chromate formed, traveling a mix comprising a chrome ore, an alkali metal carbonate and a relatively infusible alkaline absorbent through such zone in such a direction that the material, after passing through the maximum temperature, will subsequently pass to the minimum temperature, maintaining an oxidizing atmosphere in said zone, and continuously agitating the material while passing through the heated zone until it has cooled below the fusing point of the alkali chromate formed until a granular product is obtained.

In testimony whereof, I have hereunto set my hand.

GEORGE P. FULLER.